US008605306B2

(12) United States Patent
Takahashi et al.

(10) Patent No.: US 8,605,306 B2
(45) Date of Patent: Dec. 10, 2013

(54) IMAGE FORMING APPARATUS

(75) Inventors: Keita Takahashi, Abiko (JP); Atsushi Otani, Moriya (JP); Shoji Takeda, Tokyo (JP); Satoru Yamamoto, Abiko (JP); Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/167,363

(22) Filed: Jun. 23, 2011

(65) Prior Publication Data

US 2012/0008159 A1 Jan. 12, 2012

(30) Foreign Application Priority Data

Jul. 6, 2010 (JP) ................................. 2010-154357

(51) Int. Cl.
*G06F 15/00* (2006.01)

(52) U.S. Cl.
USPC .......................................................... 358/1.14

(58) Field of Classification Search
USPC .......................................................... 358/1.14
See application file for complete search history.

(56) References Cited

U.S. PATENT DOCUMENTS

| | | | | |
|---|---|---|---|---|
| 6,788,434 | B1 | 9/2004 | Kanematsu et al. | |
| 2004/0042039 | A1* | 3/2004 | Kodera et al. | 358/1.15 |
| 2010/0231962 | A1 | 9/2010 | Sakai et al. | |

FOREIGN PATENT DOCUMENTS

| | | | |
|---|---|---|---|
| JP | 2003186691 | A | 7/2003 |
| JP | 2004220562 | A | 8/2004 |
| JP | 2005031865 | A | 2/2005 |

* cited by examiner

*Primary Examiner* — Saeid Ebrahimi Dehkordy
(74) *Attorney, Agent, or Firm* — Fitzpatrick, Cella, Harper & Scinto

(57) ABSTRACT

The image forming apparatus has the plurality of control units and executes distributed processing in which any one control unit having monitoring execution authority monitors for an abnormal condition in each control unit. Each control unit determines, from its own processing load, monitoring capability information that indicates whether monitoring for an abnormal condition is possible or not. If, in a case where the control unit has the monitoring execution authority, the monitoring capability information does not satisfy predetermined information, then the control unit delegates the monitoring execution authority to another control unit whose monitoring capability information does satisfy the predetermined information.

8 Claims, 11 Drawing Sheets

IMAGE FORMING APPARATUS

BACKGROUND OF THE INVENTION

1. Field of the Invention

The present invention relates to an image forming apparatus implemented by a distributed control system that includes multiple CPU groups having a hierarchical structure.

2. Description of the Related Art

In controlling the printer device of an image forming apparatus that employs electrophotography, the practice is to carry out centralized control by a single CPU. However, an increase in CPU load ascribable to centralized control at a single point necessitates a higher performance CPU. Furthermore, an increase in printer-device control load is accompanied by the need to route communication cables (communication harness) from the CPU substrate to a control-load driver unit distant from the CPU, and a number of very long communication cables are required. In order to solve this problem, attention has focused on a control configuration in which each of the control modules that constitute the electrophotographic system is divided into individual sub-CPUs.

Examples in which a control system is thus constructed by dividing up the control functions of individual partial modules using a plurality of CPUs have been proposed in several fields relating to control-device products. For example, there is a system in which the functional modules of a vehicle are arranged hierarchically and undergo distributed control, and a system in which a hierarchical control structure is applied to robotic/automated devices. Further, each of these multiple sub-CPUs naturally has a communication unit so that all of them may operate together as a single system, and each CPU carries out information sharing and system control with the other CPUs through its communication unit.

In such a system that performs distributed control via a communication unit (the system will be referred to as a "distributed system" below), anomaly detection is an important issue. Anomalies in a distributed system include a physical anomaly in the communication unit per se and a logical anomaly brought about by the application software that operates each CPU. A parity check or CRC check of serial communication, for example, is known as a general technique for detecting physical anomalies. Another known technique further enhances network reliability by a specific communication protocol, such as a technique for counting the number of times errors occur in a CAN (Control Area Network) and excluding them from the network. There are many cases where these techniques for detecting physical anomalies are implemented by hardware, and they are capable of detecting anomalies accurately.

For the detection of logical anomalies, on the other hand, the techniques described below have been proposed. For example, the specification of Japanese Patent Laid-Open No. 2003-186691 proposes a controller having a master CPU, a slave CPU and a timer for supplying the master CPU and the slave CPU with a reset signal if an anomaly is detected. When the master CPU itself is normal, it outputs a timer-clearing signal to the timer at fixed time intervals. Specifically, if an anomaly occurs in the master CPU, the master CPU will not output the signal that clears the timer and the timer will time out. As a consequence, the master CPU and the slave CPU will be supplied with the reset signal. Further, the master CPU monitors data that is output from the slave CPU and, if it determines from this data that the slave CPU has developed an anomaly, the master CPU forcibly supplies the slave CPU with a forced reset signal. Further, the specification of Japanese Patent Laid-Open No. 2004-220562 proposes a device having a device monitoring function for monitoring another device different from its own and notifying a device management server or the other device of the result of monitoring.

The specification of Japanese Patent Laid-Open No. 2005-031865 proposes an electronic control apparatus separately provided with a monitoring control circuit for monitoring anomalies. The monitoring control circuit successively transmits a number of inquiries by inquiry packets to a microprocessor that controls a group of electrical loads in response to the content of a non-volatile program memory and the operating status of an input sensor group, and makes an anomaly determination by comparing the content of a response from the microprocessor against right-answer information. The microprocessor analyzes the intervals at which it receives the inquiry packets and thus reverse-monitors the monitoring operation of the monitoring control circuit.

However, applying these conventional techniques to a distributed system results in certain problems. For example, with the method of clearing the timer from the master CPU, it is difficult for the master CPU to detect an anomaly if one should occur in the slave CPU. This makes it difficult to realize optimum anomaly processing control in a slave CPU. Further, in the case of Japanese Patent Laid-Open No. 2004-220562, anomaly information can only be received by the node that detected it and by separate nodes that have been so notified, and it is difficult for nodes other than these to ascertain the anomaly. Furthermore, if the control load of the monitoring node increases, this will result in a decline in the frequency of execution of anomaly detection control, which generally has a lower execution priority that that of load control. This lengthens the time from occurrence of an anomaly to the detection thereof. Further, in a case where a monitoring control circuit or a node dedicated to anomaly detection is provided, as in Japanese Patent Laid-Open No. 2005-031865, higher cost is inevitable.

SUMMARY OF THE INVENTION

The present invention enables realization of an image forming apparatus for performing distributed control using multiple control units, in which a control unit among the multiple control units that is capable of monitoring for an abnormal condition in the other control units executes monitoring processing based upon the control load of each control unit.

One aspect of the present invention provides an image forming apparatus, which comprises a first control unit, a second control unit and a third control unit, for performing distributed control using each of the control units, the first control unit and the second control unit comprising: a monitoring unit that monitors for an abnormal condition in the third control unit in a case where they have monitoring execution authority for monitoring for the abnormal condition; the first control unit further comprising a determination unit that determines whether monitoring for the abnormal condition is possible in accordance with its own processing load; and wherein, in a case where it has the monitoring execution authority, the first control unit delegates the monitoring execution authority to the second control unit if it is determined by the determination unit that monitoring for the abnormal condition is not possible.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of Image Forming Apparatus>

Figure 1:
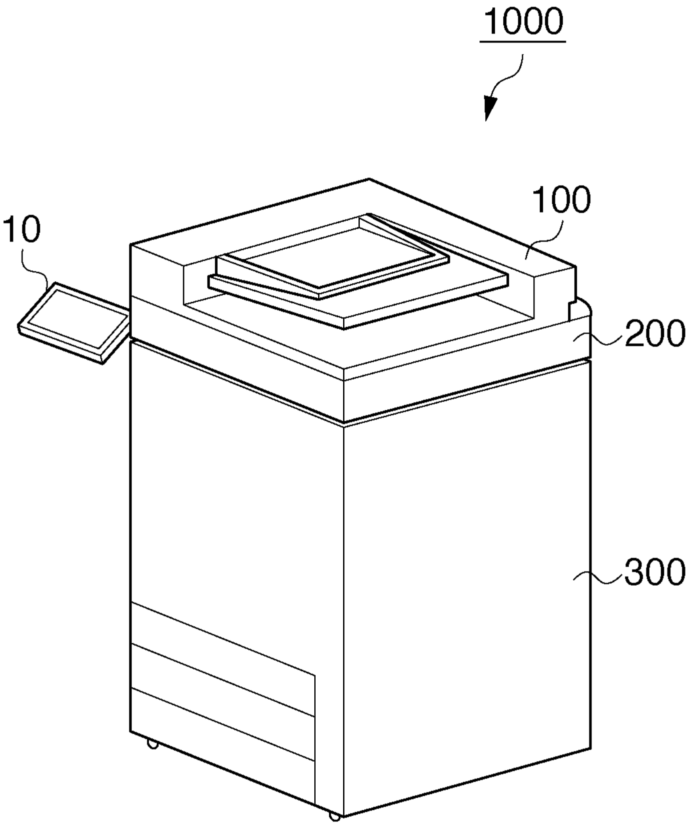
FIG. 1 is a diagram illustrating the general appearance of an image forming apparatus 1000 according to an embodiment of the present invention.

A preferred embodiment of the present invention will be described with reference to FIGS. 1 to 13. FIG. 1 is a diagram illustrating the general appearance of an image forming apparatus 1000 according to this embodiment. The image forming apparatus 1000 includes an automatic document feeder (DF) 100, an image reading unit 200, an image forming unit 300 and a control panel 10. As illustrated in FIG. 1, the image reading unit 200 has been placed on the image forming unit 300, and the automatic document feeder 100 has been placed on the image reading unit 200. The image forming apparatus 1000 implements distributed control using multiple control units (CPUs). The arrangement of the CPUs will be described later with reference to FIG. 3.

The automatic document feeder 100 feeds documents to a platen glass automatically. The image reading unit 200 reads a document fed from the automatic document feeder 100 and outputs image data. The image forming unit 300 forms an image on printing material in accordance with the image data that has been output from the automatic document feeder 100 or image data that has been input from an external apparatus connected via a network. The control panel 10 has a GUI (Graphical User Interface) used by a user to perform various operations. The control panel 10 further includes a display unit such as a touch-sensitive panel for presenting the user with information.

Figure 2:
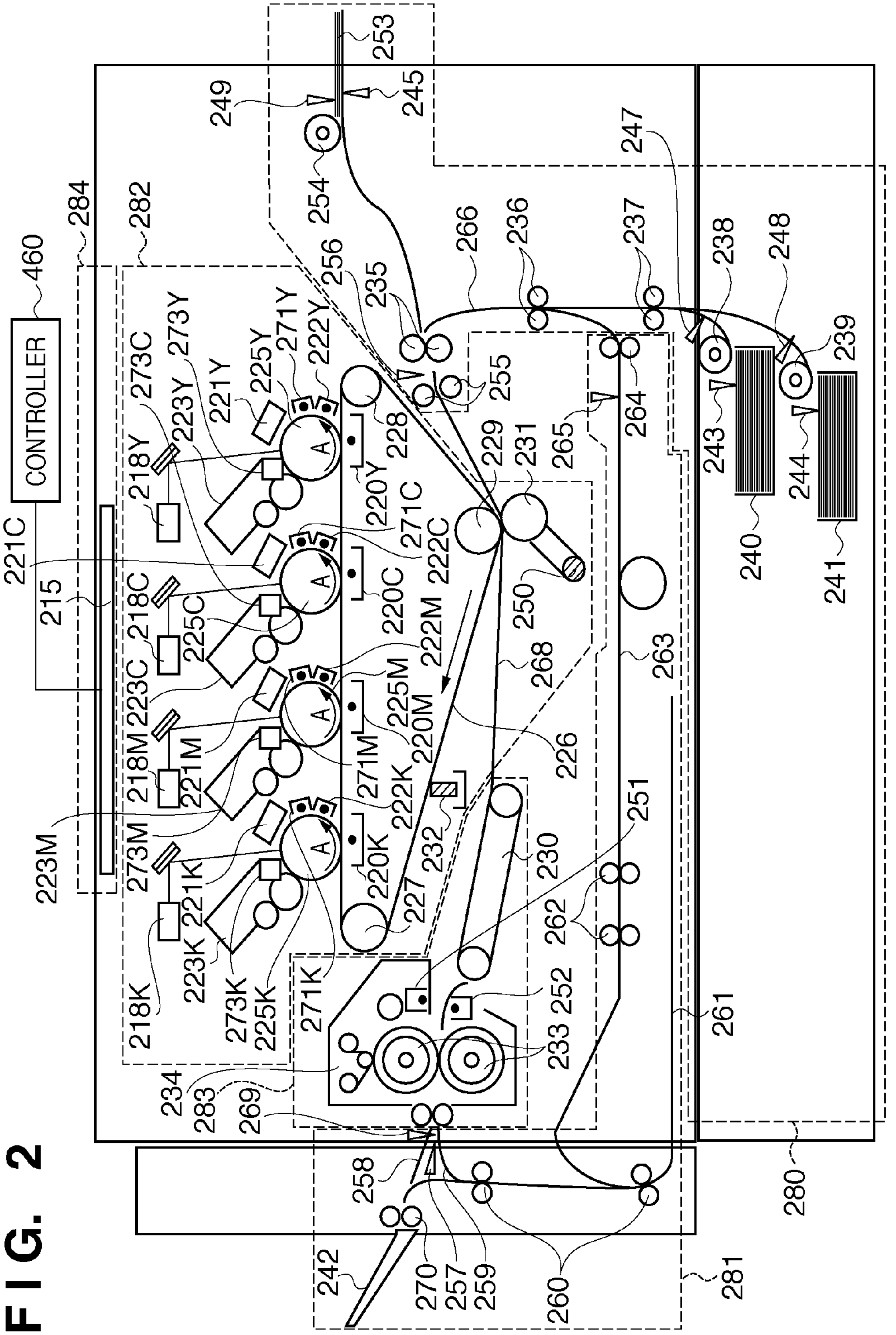
FIG. 2 is a sectional view illustrating an example of the configuration of an image forming unit 300 according to this embodiment.

Next, the details of the image forming unit 300 will be described with reference to FIG. 2. The image forming unit 300 in this embodiment employs electrophotography. It should be noted that the alphabetic characters Y, M, C and K that are appended to the reference numerals in FIG. 2 indicate printer engines that correspond to toners of the colors yellow, magenta, cyan and black, respectively. In the description that follows, the appended alphabetic characters Y, M, C, K will be omitted and only the reference numerals shown if the printer engines corresponding to all of the toners are illustrated, but the reference numerals will be shown with the appended alphabetic characters Y, M, C, K if the printer engines are illustrated individually.

A photoconductive drum (referred to simply as a "photoconductor" below) 225 for forming a full-color electrostatic image is provided as an image carrier capable of being rotated in the direction of arrow A by a motor. Arranged surrounding the photoconductor 225 are a primary charging unit 221, an exposure unit 218, a developing unit 223, a transfer unit 220, a cleaner unit 222, a de-electrifying unit 271 and a surface potentiometer 273.

Developing unit 223K is a developing unit for monochrome development and develops a latent image on photoconductor 225K using toner of color K. Further, developing units 223Y, M, C are developing units for full-color development and develop latent images on photoconductors 225Y, M, C using toners of colors Y, M, C, respectively. The toner images of the respective colors developed on the photoconductors 225 are transferred collectively in multiplexed fashion by the transfer units 220 to a transfer belt 226, which is an intermediate transfer member, whereby toner images of the four colors are superimposed on the belt.

The transfer belt 226 is looped about rollers 227, 228, 229. The roller 227 functions as a driver roller coupled to a driving source to drive the transfer belt 226, and the roller 228 functions as a tension roller that adjusts the tension of the transfer belt 226. The roller 229 functions as a back-up roller of a transfer roller serving as a secondary transfer unit 231. A transfer-roller engage/disengage unit 250 is a drive unit for bringing the secondary transfer unit 231 into and out of contact with the transfer belt 226. A cleaner blade 232 is provided below the transfer belt 226 at a position downstream of the secondary transfer unit 231. The cleaner blade 232 scrapes off residual toner from the transfer belt 226.

Printing material (printing paper) contained in cassettes 240, 241 and in a manual-insertion feeder 253 is fed to nipping portion, namely a portion where the secondary transfer unit 231 and transfer belt 226 come into contact with each other, by a registration roller 255, a feed roller pair 235 and vertical-path roller pairs 236, 237. At this time the secondary transfer unit 231 will have been brought into contact with the transfer belt 226 by the transfer-roller engage/disengage unit 250. The toner images that have been formed on the transfer belt 226 are transferred to the printing material at the nipping portion. The printing material to which the toner images have been transferred is subsequently sent to a fixing unit 234, which thermally fixes the toner images, and then the printing material is discharged to the exterior of the apparatus.

The cassettes 240, 241 and manual-insertion feeder 253 have no-sheet detection sensors 243, 244 and 245, respectively, for detecting whether or not recording material is present. The cassettes 240, 241 and manual-insertion feeder 253 further have feed sensors 247, 248 and 249, respectively, for detecting recording-material pick-up failure.

The image forming operation by the image forming unit 300 will now be described. When image formation starts, the recording material contained in the cassettes 240, 241 and manual-insertion feeder 253 is fed to the feed roller pair 235 one sheet at a time by the pick-up rollers 238, 239 and 254. When the recording material is fed to the registration roller 255 by the feed roller pair 235, passage of the printing material is detected by a registration sensor 256 located immediately ahead.

In this embodiment, the moment passage of the printing material is detected by the registration sensor 256, the feeding operation is halted temporarily upon passage of a prescribed period of time. As a result, the printing material abuts against the stationary registration roller 255 and feeding of the printing material stops. However, the feed position is fixed in such a manner that the edge of the printing material in the direction of travel will be perpendicular to the conveyance path at this time, and skewed travel in a state in which the feed direction of the printing material has deviated from the conveyance path is corrected. This process will be referred to as "positional correction" below. The positional correction is necessary in order to minimize subsequent of the image formation direction with respect to the printing material. After the positional correction, the printing material is supplied to the secondary transfer unit 231 by starting up the registration roller 255. It should be noted that the registration roller 255 is coupled to a driving source and is driven into rotation by drive transmitted to it by a clutch.

Next, voltage is applied to the primary charging unit 221 so that the surface of the photoconductor 225 will be negatively charged to a predetermined charging potential. Exposure is then performed by the exposure unit 218, which comprises a laser scanner, in such a manner that the image on the charged photoconductor 225 will take on a prescribed exposure potential. A latent image is formed as a result. The exposure unit 218 forms the latent image corresponding to the above-mentioned image by turning a laser beam on and off based upon image data sent from a controller 460 via a printer control interface 215. The surface potentiometer 273 measures and outputs the surface potential of the photoconductor 225, the surface of which has been charged uniformly by the primary charging unit 221.

A developing bias that has been preset for every color is applied to the developing roller of the developing unit 223. The above-mentioned latent image is developed by toner when the latent image passes by the position of the developing roller, and is visualized as a toner image. The toner image is transferred to the transfer belt 226 by the transfer unit 220 and is further transferred by the secondary transfer unit 231 to the printing material fed from the feeding unit. After the printing material is registered, it passes along a conveyance path 268 and is conveyed to the fixing unit 234 via a fixing conveyance belt 230.

The printing material is first charged by pre-fixing charging devices 251, 252 at the fixing unit 234 in order to assist the adsorptivity of the toner and prevent disturbance of the image, and the toner image is thermally fixed by fixing rollers 233. By subsequently changing over the conveyance path to a discharge path 258 by means of a discharge flapper 257, the printing material is discharged into a drop tray 242 as is by discharge rollers 270.

Toner remaining on the photoconductor 225 is removed and recovered by the cleaner unit 222. Finally, the photoconductor 225 is de-electrified uniformly to the vicinity of 0 volts by the de-electrifying unit 271 to prepare for the next image formation cycle.

Since the timing at which color image formation by the image forming apparatus 1000 starts is that at which simultaneous transfer of the Y, M, C, K toner images is performed, it is possible for image formation to be carried out at any position on the transfer belt 226. However, it is necessary to decide the image-formation start timing while temporally shifting the amount of deviation of the position to which the toner images on the photoconductors 225Y, M, C, K are transferred.

In the image forming unit 300, it is possible to feed the printing material continuously from the cassettes 240, 241 and manual-insertion feeder 253. In such case the sheet length of the preceding sheet of printing material is taken into consideration and the printing material is fed from the cassettes 240, 241 and manual-insertion feeder 253 at the shortest intervals that will not cause overlapping of sheets of the printing material. As mentioned above, the printing material is supplied to the secondary transfer unit 231 by starting the registration roller 255 after the positional correction is performed. When the printing material arrives at the secondary transfer unit 231, however, the registration roller 255 is stopped again temporarily. This is to subject the succeeding sheet of printing material to a positional correction in the same manner as the preceding sheet of printing material.

Next, operation in a case where an image is formed on the back side of the printing material will be described. When an image is formed on the back side of the printing material, this is preceded first by image formation on the front side of the printing material. If an image is formed only on the front side, the printing material is discharged into the drop tray 242 as is after the toner image is thermally transferred by the fixing unit 234. On the other hand, if an image is to formed on the back side following image formation on the front side, the printing material is sensed by a sensor 269. When this occurs, the conveyance path is switched over to a back-side path 259 by the discharge flapper 257 and the printing material is fed to a double-side turn-over path 261 by reversing rollers 260 driven into rotation in conformity with the path changeover. The printing material is than conveyed along the double-side turn-over path 261 by the amount of width in the feed direction, after which the traveling direction is switched by driving the reversing rollers 260 in the opposite direction. With the front side on which the image has been formed thus faced downward, the printing material is conveyed to a double-side path 263 by driving double-side path feed rollers 262.

Next, when the printing material is conveyed along the double-side path 263 toward re-feed rollers 264, passage of the printing material is sensed by a re-feed sensor 265 immediately ahead. When passage of the printing material is sensed by the re-feed sensor 265 in this embodiment, the feeding operation is halted temporarily upon passage of a prescribed period of time. As a result, the printing material abuts against the re-feed rollers 264 and feeding of the printing material stops. However, the position is fixed in such a manner that the edge of the printing material in the direction of travel will be perpendicular to the conveyance path at this time, and skewed travel in a state in which the feed direction of the printing material has deviated from the conveyance path within the re-feed path is corrected. This process will be referred to as "positional re-correction" below.

The positional re-correction is necessary in order to minimize subsequent skewing of the image formation direction with respect to the back side of the printing material. After the positional re-correction, the printing material is conveyed on a re-feed path 266 in the upside-down state by activating there-feed rollers 264. The image formation operation from this point onward is the same as the foregoing operation for forming the image on the front side and need not be described again. The printing material having the images thus formed on both the front and back sides is discharged to the drop tray 242 by changing over the conveyance path to the discharge path 258 by the discharge flapper 257.

It should be noted that in the image forming unit 300, continuous feed of the printing material is possible even at the time of double-sided copying. However, since only a single channel of the devices for image formation on the printing material and for fixing the formed toner image is provided, printing on the front side and printing on the back side cannot be performed simultaneously. At the time of double-sided printing, therefore, image formation is performed at the image forming unit 300 alternately on printing material from the cassettes 240, 241 and manual-insertion feeder 253 and on printing material turned over for back-side printing and fed again to the image forming unit.

The image forming unit 300 divides each control load shown in FIG. 2 into four control blocks, namely a conveyance module A 280, a conveyance module B 281, an image forming module 282 and a fixing module 283, which are described later, and each is controlled autonomously. Furthermore, the image forming unit 300 has a master module 284 for causing these four control blocks to function collectively as an image forming apparatus. The control configuration of each module will now be described with reference to FIG. 3.

Figure 3:
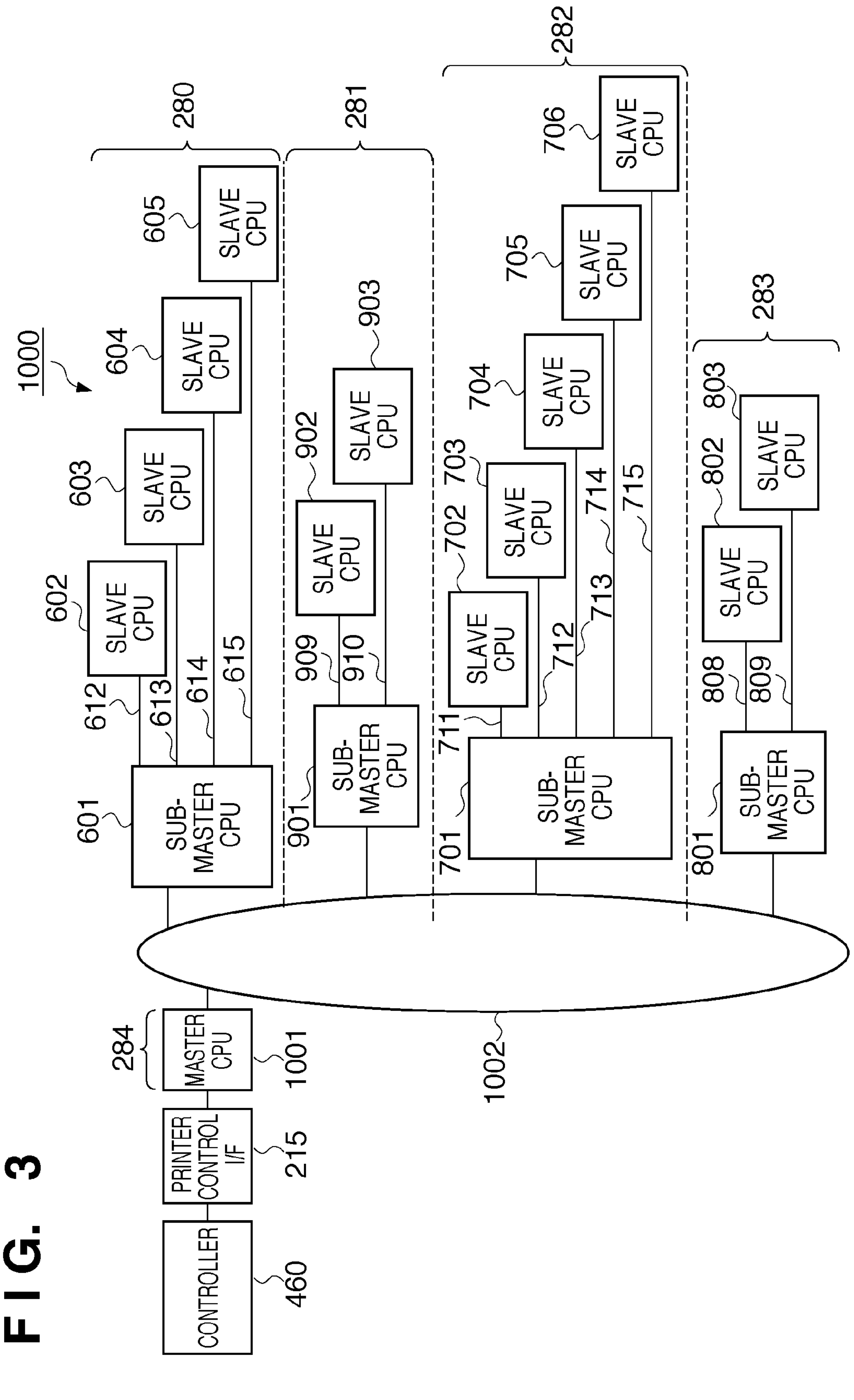
FIG. 3 is a diagram schematically illustrating the relationship among a master CPU, sub-master CPUs and slave CPUs according to this embodiment.

FIG. 3 is a diagram schematically illustrating the relationship among a master CPU, sub-master CPUs and slave CPUs according to this embodiment. In this embodiment, a master CPU (master control unit/first-layer control unit) 1001 with which the master module 284 is equipped controls the overall image forming apparatus 1000 based upon commands and image data sent from the controller 460 via the printer control interface 215. The conveyance module A 280, conveyance module B 281, image forming module 282 and fixing module 283 for executing image formation have sub-master CPUs (sub-master control units/second-layer control units) 601, 901, 701 and 801 for controlling each of these functions. The sub-master CPUs 601, 901, 701 and 801 are controlled by the master CPU 1001. The functional modules have slave CPUs (slave control units/third-layer control units) 602, 603, 604, 605, 902, 903, 702, 703, 704, 705, 706, 802, 803) for operating the control loads for the purpose of implementing each of these functions. The slave CPUs 602, 603, 604 and 605 are controlled by the sub-master CPU 601, the slave CPUs 902 and 903 are controlled by the sub-master CPU 901, the slave CPUs 702, 703, 704, 705 and 706 are controlled by the sub-master CPU 701, and the slave CPUs 802 and 803 are controlled by the sub-master CPU 801. Equipped with these multiple CPUs, the image forming apparatus implements a distributed control system.

As illustrated in FIG. 3, the master CPU 1001 is connected to the multiple sub-master CPUs 601, 701, 801 and 901 by a common network-type communication bus 1002. The sub-masters CPUs 601, 701, 801 and 901 are also interconnected by the network-type communication bus 1002. It should be noted that the master CPU 1001 and sub-master CPUs 601, 701, 801, 901 may also be ring-connected. The sub-master CPU 601 is peer-to-peer connected to each of multiple slave CPUs 602, 603, 604 and 605 via high-speed serial communication buses 612, 613, 614 and 615, respectively. Similarly, the sub-master CPU 701 is peer-to-peer connected to each of multiple slave CPUs 702, 703, 704, 705 and 706 via high-speed serial communication buses 711, 712, 713, 714 and 715, respectively. The sub-master CPU 801 is peer-to-peer connected to each of multiple slave CPUs 802 and 803 via high-speed serial communication buses 808 and 809, respectively. The sub-master CPU 901 is peer-to-peer connected to each of multiple slave CPUs 902 and 903 via high-speed serial communication buses 909 and 910, respectively. Here the high-speed serial communication buses are used for short-range high-speed communication.

In relation to control that requires timing-dependent response, the image forming apparatus 1000 according to this embodiment is functionally divided in such a manner that such control is implemented within the functional module under the general control of each sub-master CPU. Communication between each slave CPU, which is for driving the control load of the terminal, and each sub-master CPU is therefore achieved by connecting them using the quick-response high-speed serial communication buses. In other words, a signal line having a data-transfer timing accuracy higher than that of the first signal line is used as the second signal line.

On the other hand, the only exchange performed between the sub-master CPUs 601, 701, 801, 901 and the master CPU 1001 is for general control of the broad processing flow of the image forming operation, which does not require precise control timing. For example, the master CPU 1001 instructs the sub-master CPUs to start image formation pre-processing, start paper feed and start image formation post-processing. Further, before the start of image formation, the master CPU 1001 sends the sub-master CPUs a command that is based upon the mode (e.g., a mode such as the monochrome mode or double-sided image forming mode) of which indication has been given by the controller 460. Only an exchange that does not require precise timing control is performed also among the sub-master CPUS 601, 701, 801 and 901. That is, control of the image forming apparatus is divided into units of control that do not require precise timing control among themselves, and the sub-master CPUs control the respective units of control at a precise timing. As a result, communication traffic is minimized in this image forming apparatus 1000 and connection by the low-speed, low-cost network-type communication bus 1002 is possible. With regard to the master CPU, sub-master CPUs and slave CPUs, the control substrates on which the CPUs are mounted need not necessarily all be of uniform type; it is possible for the control substrates to be disposed in different ways in conformity with the circumstances of the device package.

Figure 4:
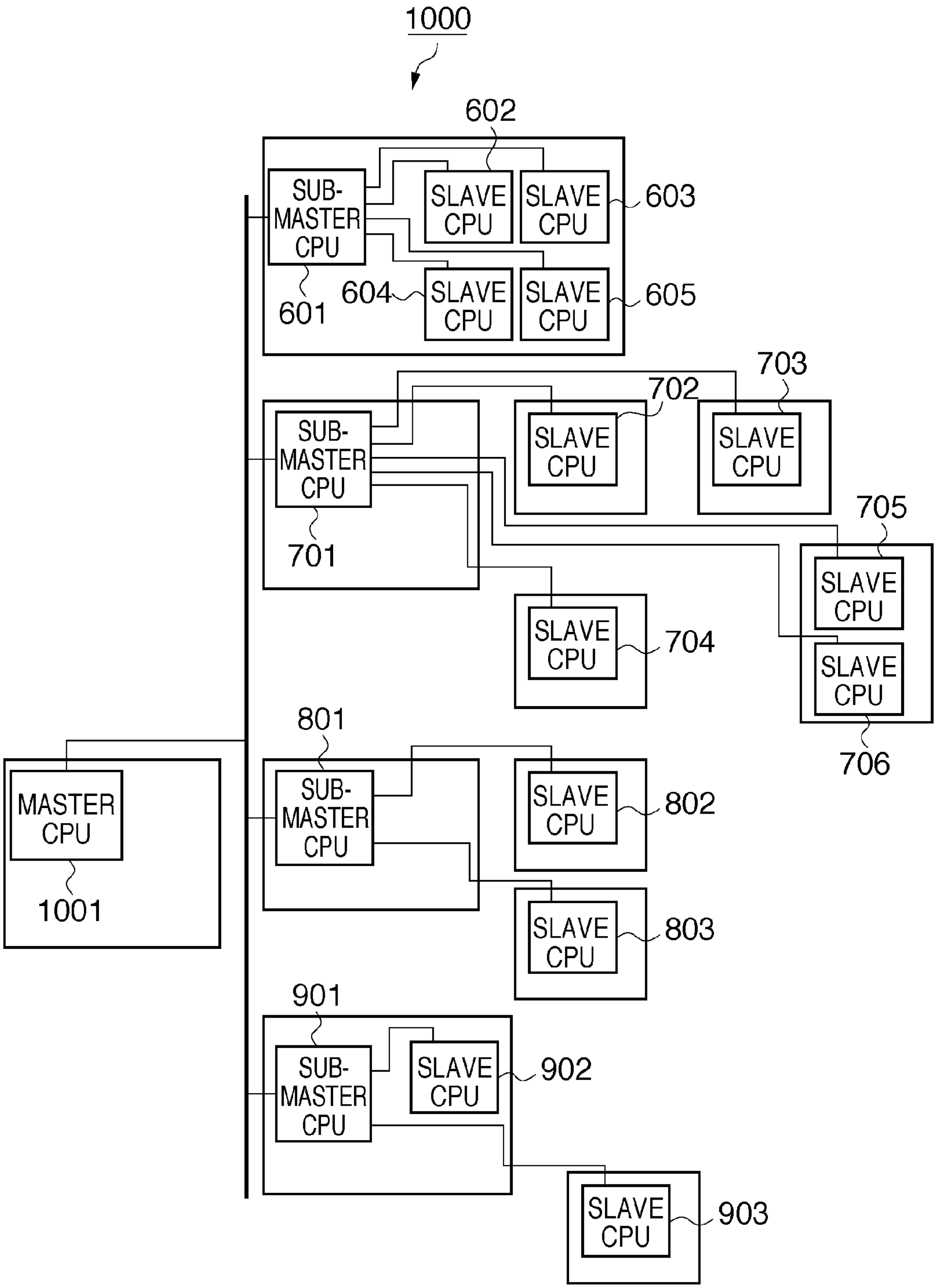
FIG. 4 is a diagram illustrating an example of control substrates of the image forming apparatus 1000 according to this embodiment.

Next, reference will be had to FIG. 4 to describe the placement of the master CPU, sub-master CPUs and slave CPUS in terms of the substrate arrangement. In accordance with this embodiment, various arrangements of control substrates can be employed, as illustrated in FIG. 4. For example, the sub-master CPU 601 and slave CPUs 602, 603, 604 and 605 have been mounted on the same substrate. Further, a sub-master CPU and individual slave CPUs may be mounted on independent substrates, as in the manner of sub-master CPU 701 and slave CPUs 702, 703, 704 or sub-master CPU 801 and slave CPUs 802, 803. Some of the slave CPUs may be mounted on the same substrate, as in the case of slave CPUs 705, 706. A sub-master CPU and only some of the slave CPUs may be placed on the same substrate, as in the manner of sub-master CPU 901 and slave CPU 902.

<Anomaly Detection Control>

Anomaly detection control, which is a characterizing feature of the present invention, will be described next. With conventional distributed control or network-computing anomaly detection control, a prescribed single module or single node detects an abnormal condition in other modules or other nodes in centralized fashion. In such cases, a problem which arises is that if the module or node implementing anomaly detection control itself develops an anomaly, then anomaly detection in the overall control system ceases functioning. A further problem is that since order of priority generally is lowered for execution of anomaly detection control, the more often processing other than anomaly detection control occurs in the above-mentioned module or node, the greater the decline in number of executions of anomaly detection control per unit time. Although a solution is possible by providing a module or node exclusively for anomaly detection, this naturally will lead to higher cost. Another conceivable method is to disperse the load of anomaly detection control by detecting an anomaly using modules or nodes that have been decided. However, since monitoring targets diminish, processing in the overall system becomes complicated as in processing at the time of anomaly occurrence when an anomaly is detected, and there is the possibility that it will be difficult to execute the desired processing. In particular, in the image forming apparatus described in this embodiment, there is the possibility that paper will be bent or folded in the conveyance path unless all motors involved in paper conveyance are stopped simultaneously, by way of example. In order to solve these problems, the present invention employs a method of delegating monitoring execution authority.

Figure 5:
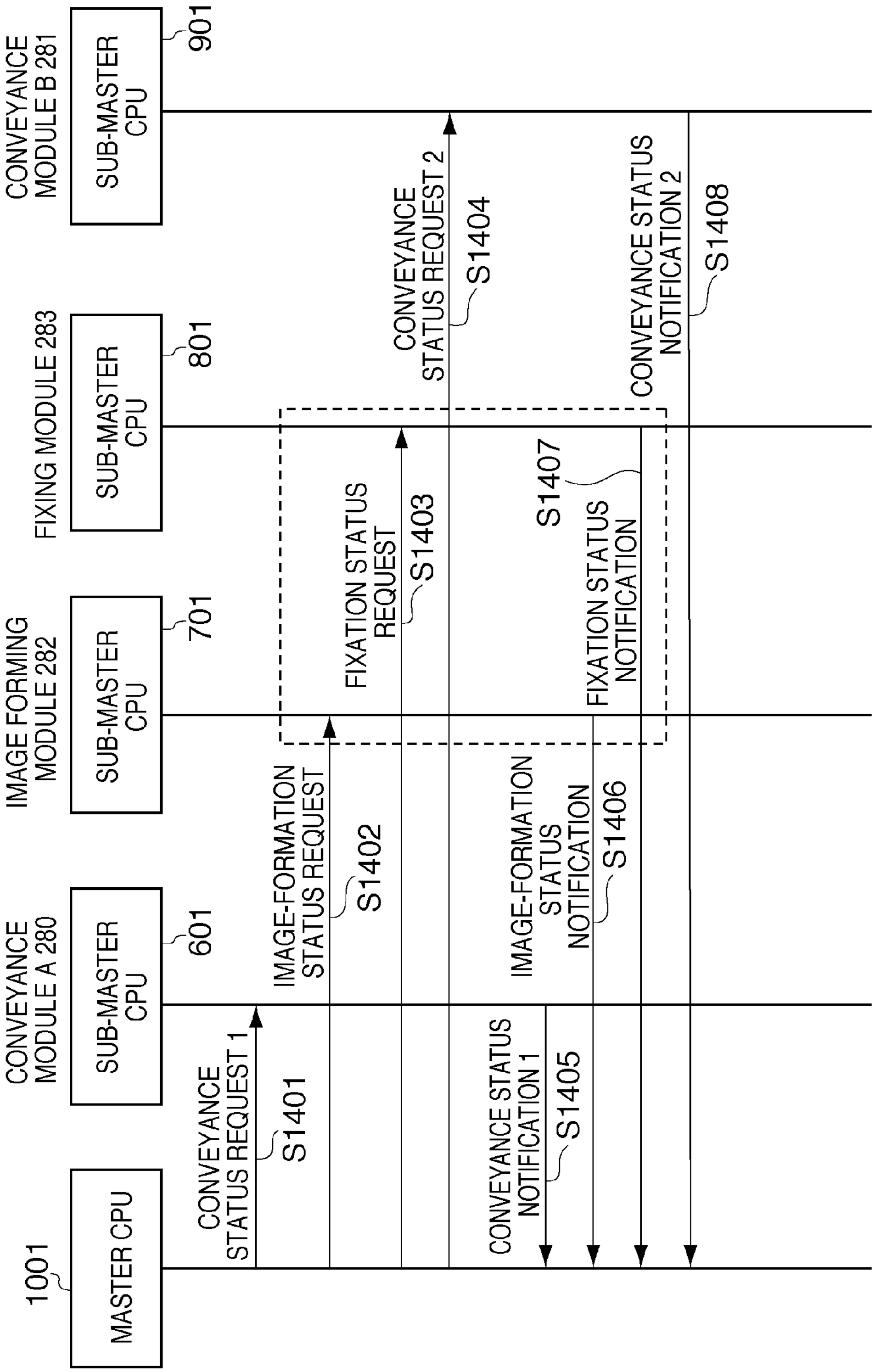
FIG. 5 is a sequence diagram illustrating a control flow of anomaly detection control between a master CPU and sub-master CPUs according to this embodiment.

First, reference will be had to FIG. 5 to describe the control flow of basic anomaly detection control according to this embodiment. This flow illustrates a pattern in which the master CPU 1001 has monitoring execution authority for executing anomaly detection processing. First, the master CPU 1001 transmits a conveyance status request 1 to the sub-master CPU 601 at S1401, transmits an image-formation status request to the sub-master CPU 701 at S1402, transmits a fixation status request to the sub-master CPU 801 at S1403 and transmits a conveyance status request 2 to the sub-master CPU 901 at S1404. In response, the sub-master CPU 601 transmits conveyance status notification 1 to the master CPU 1001 at S1405. Further, the sub-master CPU 701 transmits image-formation status notification to the master CPU 1001 at S1406. The sub-master CPU 801 transmits fixation status notification to the master CPU 1001 at S1407. The sub-master CPU 901 transmits conveyance status notification 2 to the master CPU 1001 at S1408. Here the master CPU 1001 renders a judgment on an abnormal condition based upon each status of which it has been notified. In the image forming apparatus according to this embodiment, the abnormal-condition monitoring function of the master CPU 1001 is possessed also by each sub-master CPU, and any one CPU having the monitoring execution authority executes processing for monitoring for the abnormal condition.

Figure 6:
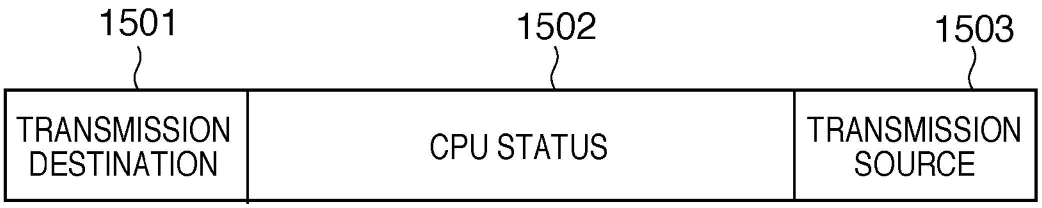
FIG. 6 is a diagram illustrating an example of a status-notification data format according to this embodiment.

The status notification transmitted from each sub-master CPU is shown in FIG. 6. The data representing the status notification transmitted from each of the sub-master CPUs at the above-mentioned steps S1405 to S1408 includes information representing transmission destination 1501, CPU status 1502 and transmission source 1503, as illustrated in FIG. 6. The details of CPU status 1502 are shown in Table 1 below.

TABLE 1

| CPU STATUS |
|---|
| NORMAL + STATUS MONITORING POSSIBLE (1) |
| NORMAL + STATUS MONITORING POSSIBLE (2) |
| NORMAL + STATUS MONITORING NOT POSSIBLE |
| ABNORMAL |

As illustrated in Table 1, the CPU status 1502 includes status information indicating whether the CPU's own status is normal or abnormal. Furthermore, in a case where the status information indicates "NORMAL", the CPU status 1502 includes information indicating whether it is possible or not possible for this CPU to possess monitoring execution authority in dependence upon idle intervals; namely information representing monitoring capability information, which indicates whether this CPU is capable or incapable of monitoring for an abnormal condition. Here the term "idle interval" indicates the time interval at which the task having the lowest priority acquires processing execution authority in the real-time operating system that has been installed in this CPU. Specifically, the larger an execution-wait task, or the greater the processing load in an execution-wait task, the longer the idle interval. The relationship between idle intervals and monitoring possibility will be described with reference to Table 2 below.

TABLE 2

| IDLE INTERVAL | MONITORING POSSIBLE |
|---|---|
| 10-50 msec | POSSIBLE (1) |
| 50-100 msec | POSSIBLE (2) |
| 100 msec- | NOT POSSIBLE |

By way of example, in this embodiment, as indicated in Table 2, monitoring for an abnormal condition is defined as "POSSIBLE (1)" if the idle interval of this CPU is 10 to 50 msec, as "POSSIBLE (2)" if the idle interval of this CPU is 50 to 100 msec, and as "NOT POSSIBLE" if the idle interval exceeds 100 msec. Each CPU transmits CPU status to the master CPU 1001 upon first appending these items of monitoring capability information to the CPU status. Further, in a case where the CPU status is abnormal, notification is given of the above-mentioned monitoring capability information. Further, "POSSIBLE (1)" indicates that it is possible to possess monitoring execution authority at any time, and "POSSIBLE (2)" indicates that it is possible to possess monitoring execution authority if another CPU whose status is "POSSIBLE (1)" does not exist. Thus, CPU status 1502 includes status information indicating whether the CPU's own status is normal or abnormal, and information representing monitoring capability information indicating whether an abnormal condition is capable of being monitored or not in a case where the CPU's own status is normal.

Figure 7:
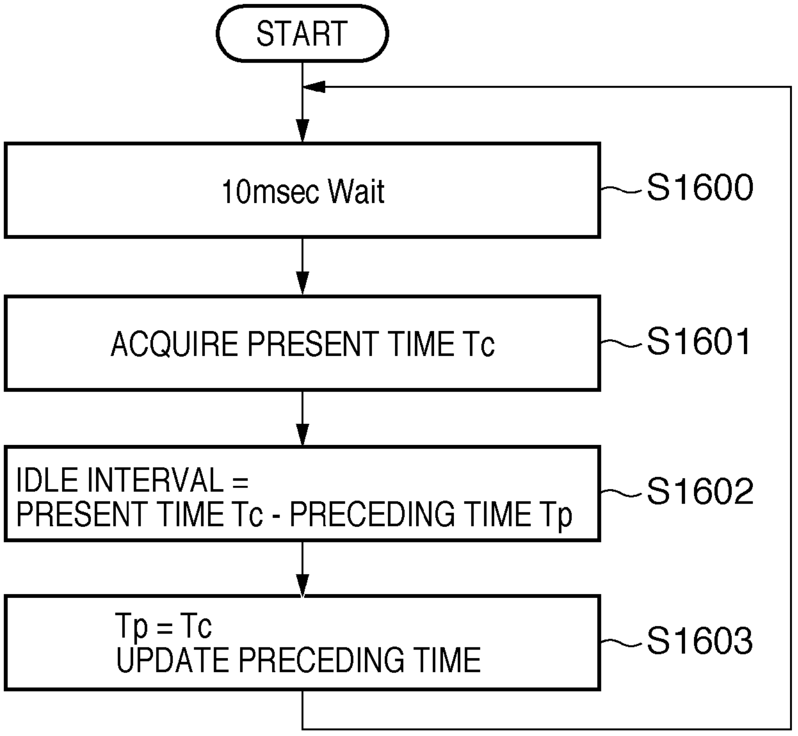
FIG. 7 is a flowchart illustrating a method of calculating an idle interval according to this embodiment.

A method of calculating an idle interval will be described with reference to FIG. 7. The processing described below is executed by each CPU in order to calculate its own idle interval. Basically, this is processing flow executed in the master CPU 1001 and in the sub-master CPUs 601, 701, 801 901 constituting the system. An example in which the master CPU 1001 executes the processing will be described.

At step S1600, the master CPU 1001 executes standby processing at a predetermined idle interval, which is 10 msec in this embodiment. For example, the master CPU 1001 issues a 10-msec timer and the processing of steps S1601 to 1603 is executed whenever the timer times out. Next, the master CPU 1001 acquires the present time Tc at step S1601 and at step S1602 finds the difference between Tc and time Tp acquired immediately previously, thereby calculating the idle interval. Then, at step S1603, the master CPU 1001 sets the preceding time Tp to the present time Tc and returns processing to step S1600. It should be noted that the larger the processing load on the master CPU 1001, the more the calculated idle interval becomes longer than 10 msec.

Figure 8:
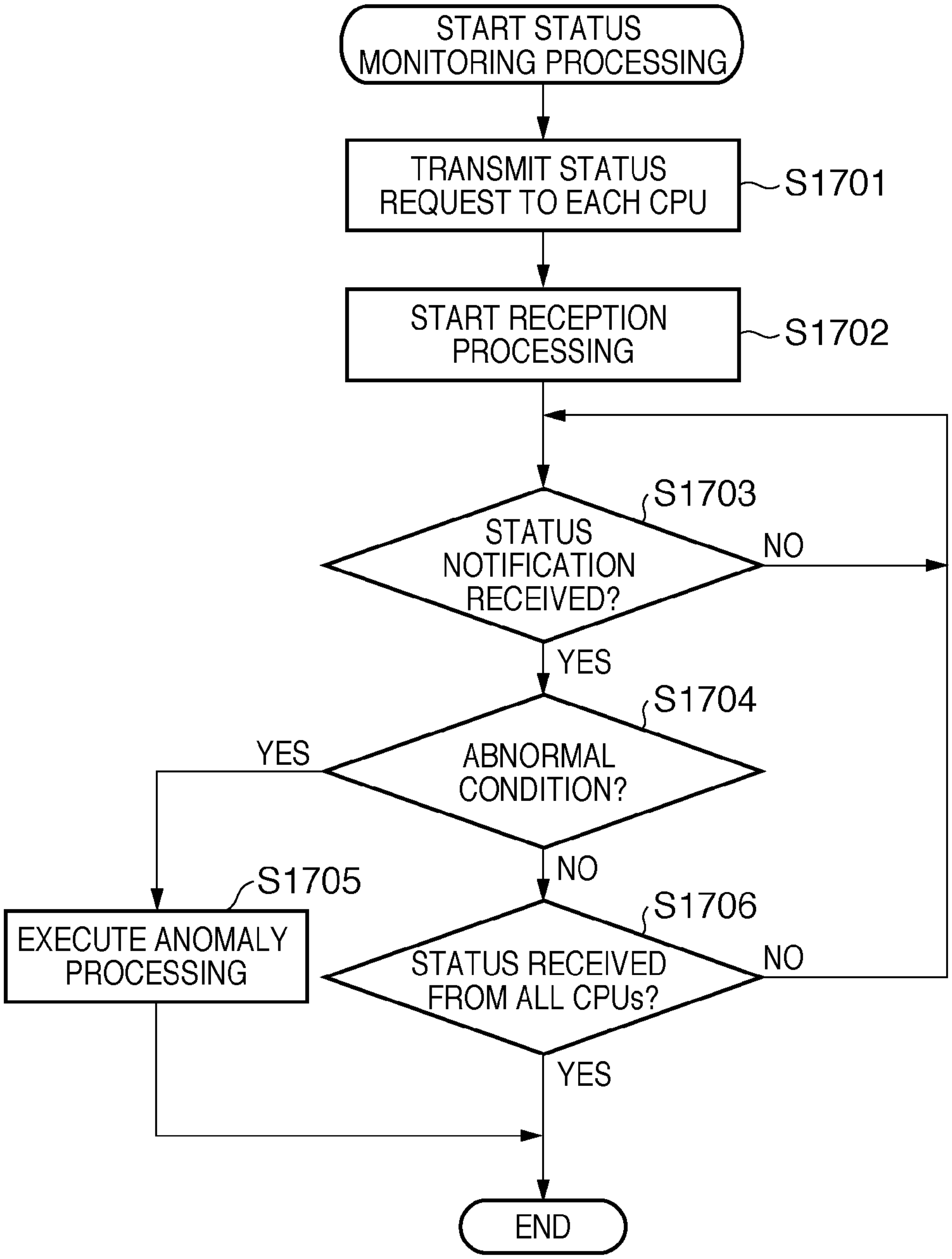
FIG. 8 is a flowchart illustrating processing by a CPU having monitoring execution authority according to this embodiment.

Next, the content of processing executed by a CPU having monitoring execution authority will be described with reference to FIG. 8. As one example, it will be assumed that the master CPU 1001 has monitoring execution authority. At step S1701, the master CPU 1001 transmits the status request to the sub-master CPUs 601, 701, 801 and 901. Then, at step S1702, the master CPU 1001 starts reception preparations and, at step S1703, determines whether status notification sent from each CPU has been received. Control proceeds to step S1704 if status notification has been received. If status notification has not been received, then the processing of step S1703 is repeated periodically.

At step S1704, the master CPU 1001 checks the CPU status 1502, which is the received status notification, and determines whether status is abnormal. In case of an abnormal condition, control proceeds to step S1705 and the master CPU 1001 starts anomaly processing. The details of anomaly processing will be described later. If status is not indicative of an abnormal condition, control proceeds to step S1706 and the master CPU 1001 determines whether status notification has been received from all CPUs. Control returns to step S1703 if status notification has been received from all CPUs and processing is exited if it has not.

Next, the content of processing executed by a CPU that has received a status request will be described with reference to FIG. 9. Processing by the sub-master CPU 801 that has received a status request will be described by way of example. When the status request is received, at step S1801 the sub-master CPU 801 uses the information shown in Table 2 to determine, based upon its own idle interval at present calculated in accordance with the flowchart of FIG. 7, whether it is capable of receiving monitoring execution authority. Next, at step S1802, the sub-master CPU 801, in a case where a lower-layer CPU exists, i.e., in a case where the sub-master CPU 801 is controlling a slave CPU, acquires the status of this slave CPU. Here since the sub-master CPU 801 is controlling the sub-master CPUs 802 and 803, it acquires the status from these slave CPUs.

Next, at step S1803, the sub-master CPU 801 determines the CPU status (TABLE 1) based upon the monitoring capability information determined at step S1801 and the acquired status information of the slave CPUs. Next, at step S1804, the sub-master CPU 801 transmits the determined information to the master CPU 1001 that transmitted the status request and terminates processing.

Figure 10:
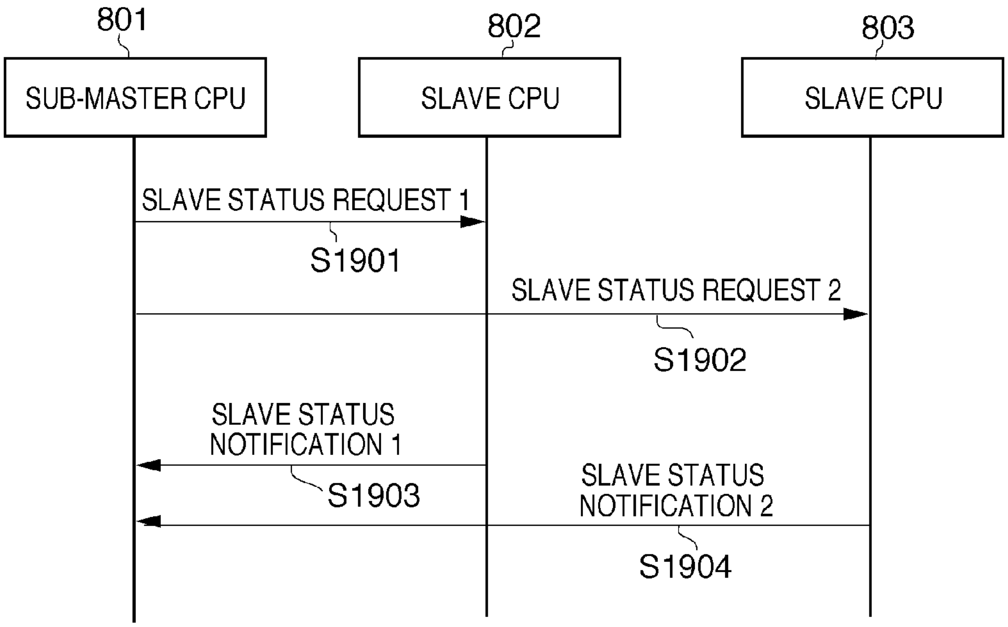
FIG. 10 is a sequence diagram illustrating a control flow of anomaly detection control between a sub-master CPU and slave CPU according to this embodiment.
Figure 11:
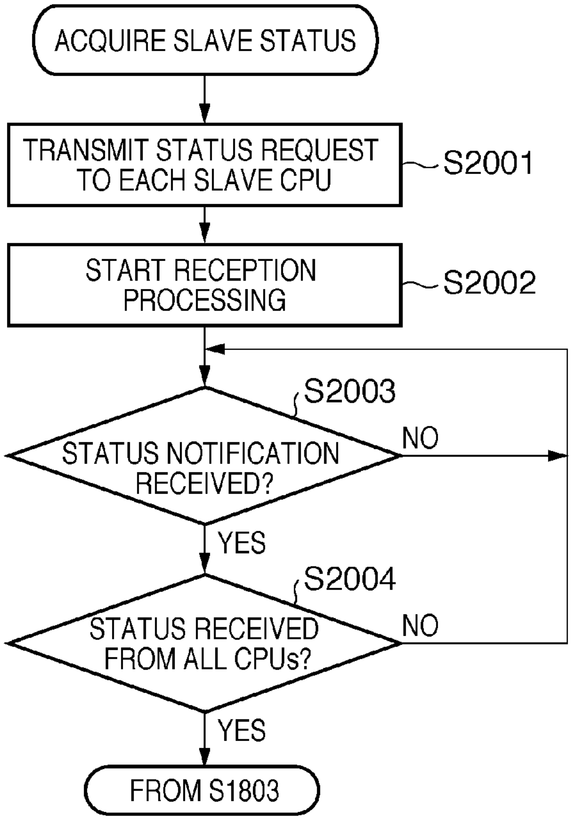
FIG. 11 is a flowchart illustrating processing by a sub-master CPU that transmits a status request according to this embodiment.

Next, reference will be had to FIGS. 10 and 11 to describe a status request that a sub-master CPU transmits to a slave CPU. Described here is processing in which the sub-master CPU 801 receives a fixation status request and acquires status information of the sub-master CPUs 802, 803 at S1403 in FIG. 5. As shown in FIG. 10, when the fixation status request of S1403 is received, the sub-master CPU 801 transmits a slave status request 1 to the sub-master CPU 802 at S1901 and transmits a slave status request 2 to the sub-master CPU 803 at S1902. The sub-master CPU 801 thenceforth receives slave status notification 1 from the sub-master CPU 802 at S1903 and receives slave status notification 2 from the sub-master CPU 803 at S1904. Thus, the sub-master CPU acquires the status of the slave CPUs that are under the control of the sub-master CPU.

Figure 9:
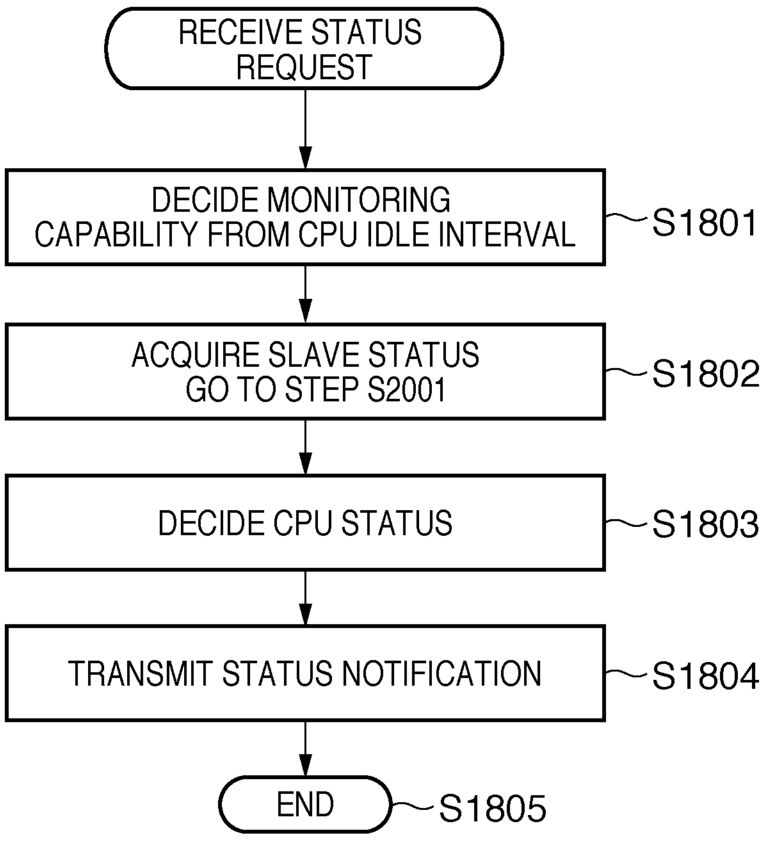
FIG. 9 is a flowchart illustrating processing by a CPU that has received a status request according to this embodiment.

FIG. 11 illustrates the details of processing executed by the sub-master CPU 801 at step S1802 in FIG. 9. At step S2001, the sub-master CPU 801 transmits a status request to each slave CPU (S1901, S1902). Next, at step S2002, the sub-master CPU 801 starts processing for receiving a response to the status request and, at step S2003, determines whether status information has been received from the slave CPU. If status information has been received, control proceeds to step S2004. If it has not been received, then the sub-master CPU 801 repeats the processing of step S2003 periodically. At step S2004, the sub-master CPU 801 determines whether status information has been received from all slave CPUs to which the status request was transmitted at step S2001. If status information has not been received from all of these slave CPUs, control returns to step S2003. If status information has been received from all of these slave CPUs, then control proceeds to step S1803.

Figure 12:
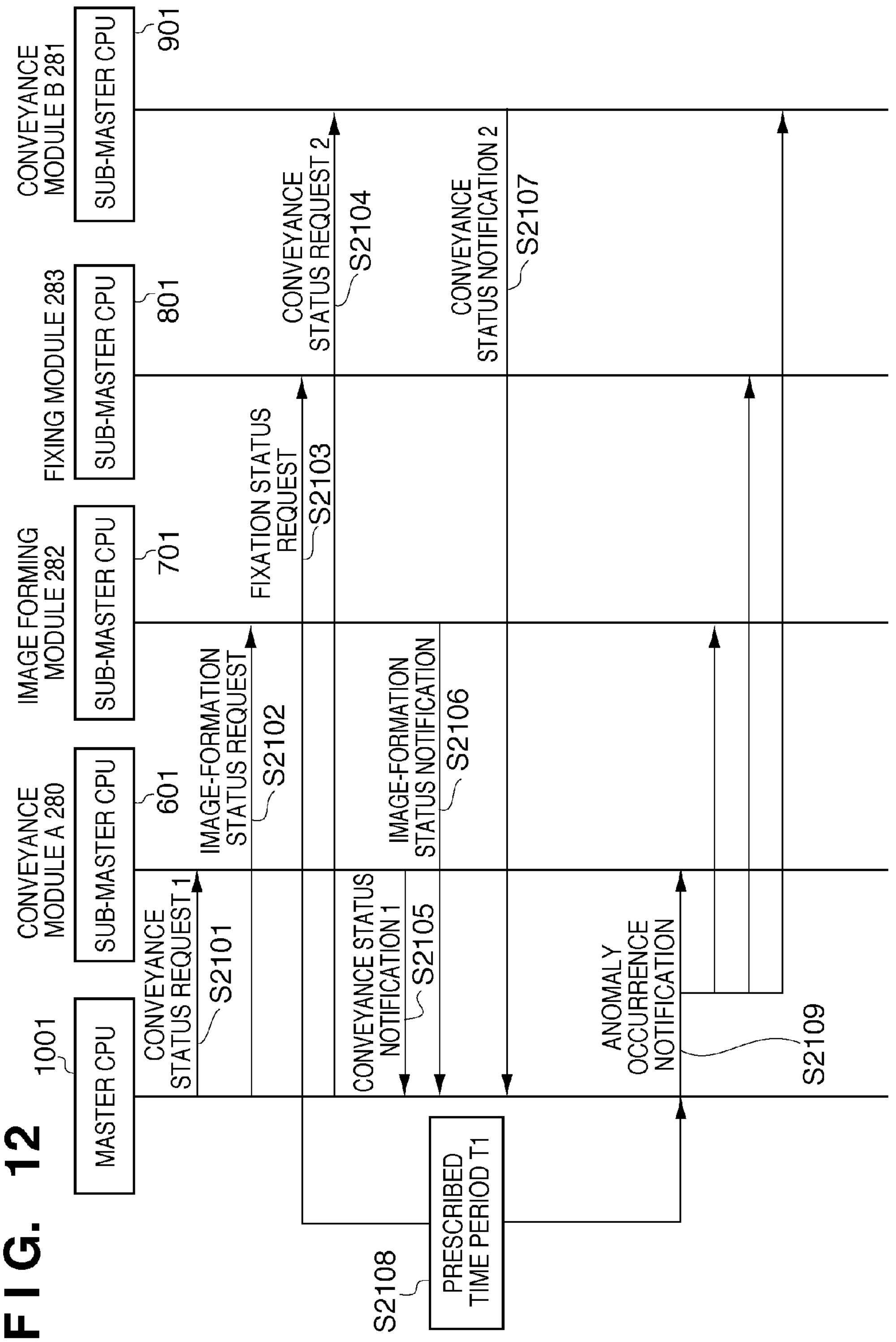
FIG. 12 is a sequence diagram illustrating a control flow in a case where an anomaly has been detected between a master CPU and a sub-master CPU according to this embodiment.

Next, reference will be had to FIG. 12 to describe control flow in a case where an anomaly has been detected. First, at S2101 to S2104, the master CPU 1001 transmits a status request to each of the sub-master CPUs 601, 701, 801 and 901. At the same time that it transmits each status request, the master CPU 1001, using a timer, measures waiting time (a prescribed time period T1), which is the time it takes each sub-master CPU to notify of its status.

In the example of FIG. 12, the sub-master CPUs 601, 701 and 901 transmit their status information to the master CPU 1001 at S2105, S2106 and S2107, respectively. The sub-master CPU 801, on the other hand, does not transmit its status information to the master CPU 1001 within the prescribed time period T1. If the master CPU 1001 cannot confirm that it has been notified of the status information within the prescribed time period (S2108), then it determines that the particular sub-master CPU (here the sub-master CPU 801) has developed an anomaly. If occurrence of an anomaly has been determined, then the master CPU 1001 sends notification of occurrence of the anomaly to each sub-master CPU at S2109.

In FIG. 12, an anomaly is determined to have occurred because there is no status notification received from the sub-master CPU 801 by the time the prescribed time period T1 elapses following transmission of the status request. Here two cases are conceivable, namely a case where the sub-master CPU 801 itself has developed an abnormal condition and a case where the master CPU 1001 cannot receive status notification because there is no notification of status from the sub-master CPUs 802 and 803.

Figure 13:
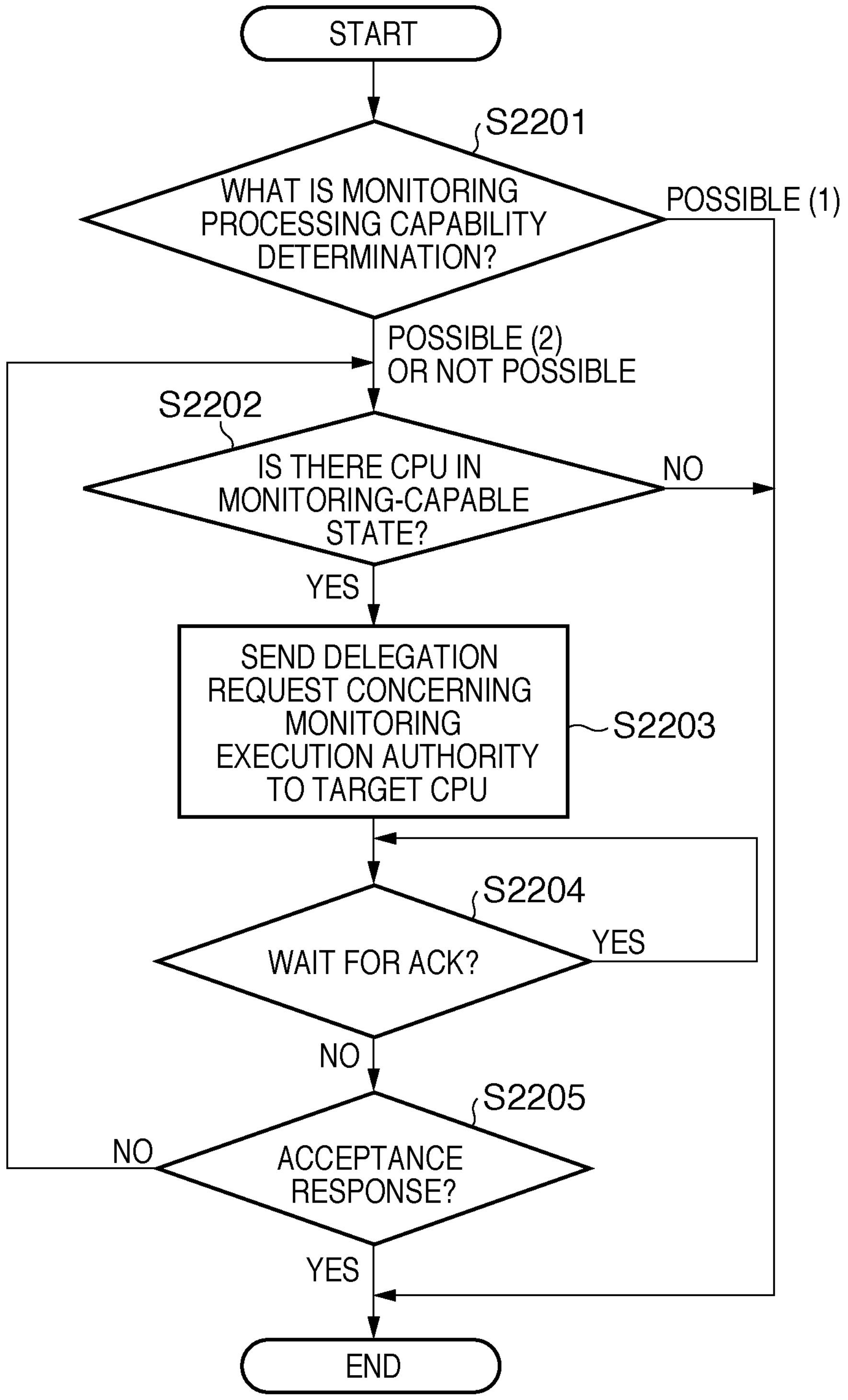
FIG. 13 is a flowchart illustrating processing by a CPU that delegates monitoring execution authority according to this embodiment.

Next, reference will be had to FIG. 13 to describe control when the master CPU 1001 delegates monitoring execution authority. First, at step S2201, the master CPU 1001 determines whether monitoring processing is possible. Here the master CPU 1001 determines that delegation of monitoring execution authority is unnecessary and exits processing if the status derived from the idle interval, which has been calculated by the calculation method described earlier, and TABLE 2 is "POSSIBLE (1)". If "POSSIBLE (2)" or "NOT POSSIBLE" is determined, control proceeds to step S2202 and the master CPU 1001 determines whether there is another CPU that is in the monitoring-capable state. In this case, the candidates are the sub-master CPUs 601, 701, 801 and 901. Specifically, the master CPU 1001 conducts a search for existence of a CPU in the "POSSIBLE (1)" state or "POSSIBLE (2)" state based upon the status of each CPU of which notification has been given by ordinary status monitoring processing. Control proceeds to step S2203 if such a CPU exists. On the other hand, the master CPU 1001 terminates processing if such a CPU does not exist.

At step S2203, the master CPU (first control unit) 1001 sends the target CPU (second control unit) a delegation request, which is a request that the target CPU accept monitoring execution authority. Then, at step S2204, the master CPU 1001 waits for notification (Ack) from the target CPU and proceeds to step S2205 if Ack is received. If the response from the target CPU is to accept the monitoring execution authority, then the master CPU 1001 delegates the monitoring execution authority and terminates processing. If there is no response to accept monitoring execution authority, then control returns to step S2202 and the master CPU 1001 conducts a search for another CPU (another control unit different from the second control unit). The reason for determining again at step S2202 whether there is a CPU to which delegation of monitoring execution authority is possible is that there is a possibility that after a target CPU (another control unit) has given notification of its status, the status thereof may have changed. The CPU that has transmitted the response to accept monitoring execution authority subsequently executes the status monitoring processing described above.

Thus, as described above, an image forming apparatus according to this embodiment includes a plurality of control units (a first, second and third control units) and performs distributed control, in which any one of the control units that has been given the monitoring execution authority monitors for an abnormal condition in each of the control units. Furthermore, each control unit determines, from its own processing load, monitoring capability information that indicates whether monitoring for an abnormal condition is possible or not. If, in a case where the control unit has the monitoring execution authority, the monitoring capability information does not satisfy predetermined information, then the control unit delegates the monitoring execution authority to another control unit whose monitoring capability information does satisfy the predetermined information. As a result, since the image forming apparatus according to this embodiment is such that the control unit that monitors for an abnormal condition in each of the control units is changed over in accordance with the processing load, whichever control unit, among the multiple control units, that is capable of monitoring for an abnormal condition in the other control units is capable of executing such monitoring processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-154357, filed on Jul. 6, 2010, which is hereby incorporated by reference herein in its entirety.

What is claimed is:

1. An image forming apparatus, which comprises a first control unit, and a second control unit, said first control unit and said second control unit comprising:

a monitoring unit that monitors for an abnormal condition in said image forming apparatus, wherein each control unit executes a monitoring process by the monitoring unit if possessing a monitoring execution authority for monitoring for the abnormal condition;

said first control unit further comprising:

a determination unit that determines whether monitoring for the abnormal condition is possible in accordance with a processing load of the first control unit; and wherein, if possessing the monitoring execution authority, said first control unit delegates the monitoring execution authority to said second control unit if it is determined by said determination unit that monitoring for the abnormal condition is not possible.

2. The apparatus according to claim 1, wherein said monitoring unit comprises:

an acquisition unit that acquires monitoring capability information, which indicates whether monitoring for an abnormal condition is possible, from other control units that are candidates for performing monitoring for the abnormal condition; and a deciding unit that decides, based upon the monitoring capability information acquired from the other control units, a control unit to which the monitoring execution authority is to be delegated.

3. The apparatus according to claim 2, wherein said acquisition unit further acquires status information from the other control units that are candidates for performing monitoring for the abnormal condition, the status information indicating whether the status of each control unit is normal or abnormal; and in a case where the status information acquired by said acquisition unit indicates abnormal, said monitoring unit decides that this control unit is in an abnormal condition.

4. The apparatus according to claim 2, wherein in a case where monitoring capability information cannot be acquired by said acquisition unit from other control units that are candidates for performing monitoring for the abnormal condition, said monitoring unit decides that these other control units are in an abnormal condition.

5. The apparatus according to claim 2, wherein when the monitoring execution authority is to be delegated to said second control unit, said first control unit sends said second control unit a delegation request, which is a request to delegate the monitoring execution authority, and delegates the monitoring execution authority to said second control unit in a case where an authority-acceptance response to the delegation request is received from said second control unit, and in a case where an authority-acceptance response to the delegation request is not received from said second control unit, said first control unit transmits the delegation request to another control unit different from said second control unit, this other control unit having monitoring capability information indicative of predetermined information.

6. The apparatus according to claim 5, wherein the monitoring capability information includes status indicating that the monitoring for the abnormal condition is possible, status indicating that the control unit possesses the monitoring execution authority if there is no other control unit whose status indicates that monitoring for the abnormal condition is possible, and status indicating that monitoring for the abnormal condition is not possible; and the predetermined information is indicative of a state indicating that monitoring for the abnormal condition is possible.

7. The apparatus according to claim 1, wherein said first control unit is a first-layer control unit that controls the overall image forming apparatus for forming an image on a printing material;

said second control unit is controlled by said first-layer control unit and includes a plurality of second-layer control units that control a plurality of functions for executing image formation; and the monitoring execution authority is given to any of said first-layer control unit and said second-layer control units.

8. The apparatus according to claim 7, further comprising a plurality of third-layer control units that is controlled by any of said plurality of second-layer units and controls loads for implementing the plurality of functions; and said second-layer control unit acquires status information indicating whether the status of said third-layer control unit that is to undergo control is normal or abnormal.

* * * * *